June 10, 1941.    R. S. MORSE    2,245,216
VACUUM APPARATUS
Filed Oct. 11, 1939
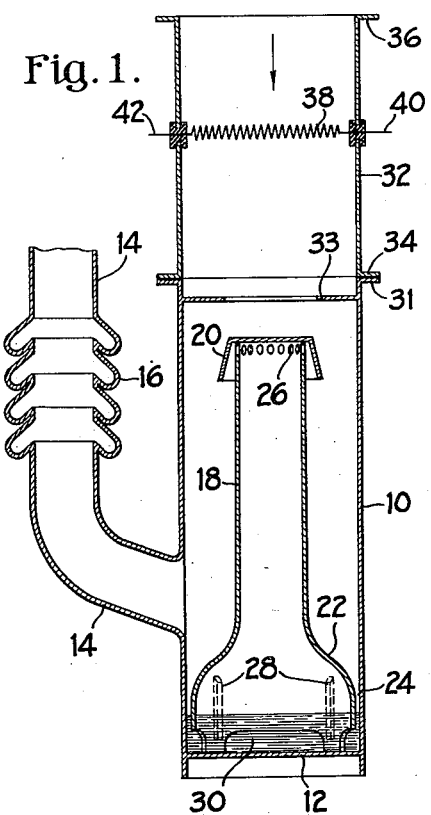
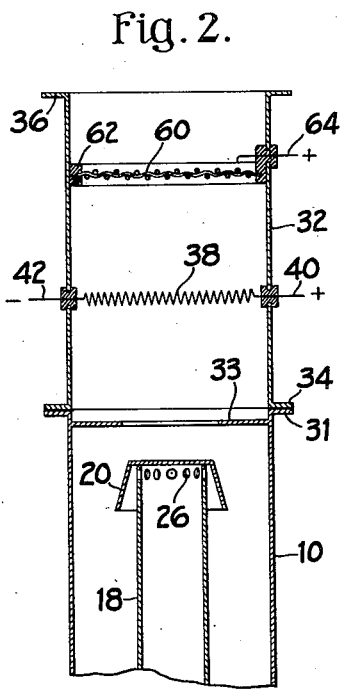
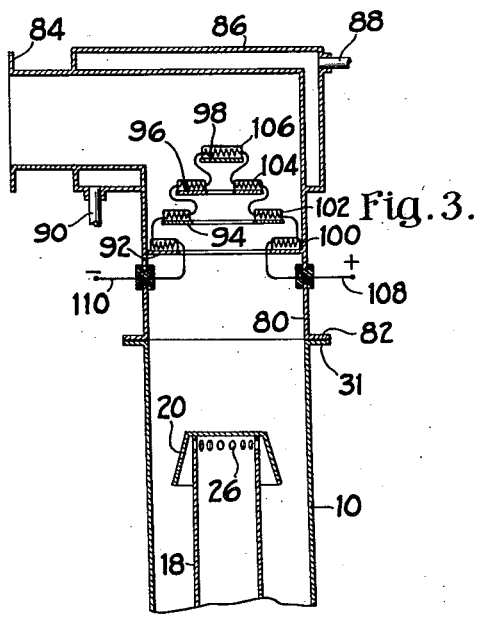
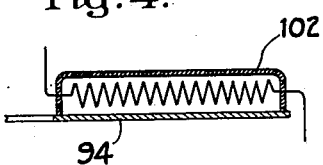
Inventor
Richard S. Morse
By Newton M Perriss
Warren H. Cannon
Attorneys Patented June 10, 1941

2,245,216

UNITED STATES PATENT OFFICE 2,245,216

VACUUM APPARATUS

Richard S. Morse, Rochester, N. Y., assignor to Distillation Products, Inc., Rochester, N. Y., a corporation of Delaware Application October 11, 1939, Serial No. 298,952

10 Claims. (Cl. 230—101)

This invention relates to vacuum apparatus and more particularly to apparatus for removing reverse flowing vapors derived from a condensation pump.

When a condensation pump is employed to produce a high vacuum in a closed receptacle or in a closed system, it has been found that a part of the vapors flow from the jet of the condensation pump in a reversed direction and tend to pass into the receptacle being evacuated and/or condense on the walls of the conduit connecting the pump to the receptacle being evacuated. Such reverse flowing vapors exert a harmful action and prevent the production of the highest possible vacua, and/or contaminate the system under evacuation. This difficulty has heretofore been substantially overcome by placing a cold trap at the high vacuum end of the pump so that such reverse flowing vapors are condensed and their vapor pressure lowered so that they cannot harmfully affect the vacuum. Such cold traps have the disadvantage that they are costly to operate since they require expensive cooling, which, in some cases, must be liquid air. They also require constant attention by the operator.

This invention has for its object to provide a simple and economical method of removing such reverse flowing vapors from a condensation pump and/or the system to which it is attached. Another object is to provide a simple vacuum vapor trap which is economical to operate. Other objects will become apparent from the following description and claims.

These and other objects are accomplished in accordance with my invention which comprises providing a heated surface at the high vacuum end of the pump. In other words, the heated surface is located between the high vacuum jet of the condensation pump and the system being evacuated. During operation the heated surface heats the reverse flowing pump vapors and maintains them in a vaporous or gaseous condition so that they are prevented from condensing in the system. Consequently, they are removed by the pump in the same manner as the gases being removed from the system.

In the following examples and description I have set forth several of the preferred embodiments of my invention but it is to be understood that these are given for the purpose of illustration and not in limitation thereof.

In the drawing in which like numbers refer to like parts:

Fig. 1 illustrates an elevation in section of a combination condensation pump and heating means for reverse flowing vapors in accordance with my invention;

Fig. 2 is a fragmentary section in elevation showing a modification of the heating means illustrated in Fig. 1;

Fig. 3 is a fragmentary elevation in section of a modified trap for removing reverse flowing vapors in accordance with my invention, and Fig. 4 is an enlarger fragmentary section in elevation of one of the heating baffles shown in Fig. 3.

Referring to Fig. 1, numeral 10 designates a cylindrical casing of a conventional condensation pump. The pump casing is provided with a base 12 and an integral conduit 14 which connects to the backing pump. Conduit 14, therefore, represents the high pressure end of the pump and is provided with reentrant rings 16 which serve to collect volatile components of the pump fluid and prevent their return to the boiler of the pump. Numeral 18 designates a cylindrical chimney provided at the top with a truncated cone jet 20 and at the base with an expansion 22 which is of such diameter that a small space 24 is provided for flow of condensate between the wall of pump casing 10 and expanded section 22. Numeral 26 designates a plurality of holes at the top of chimney 18. Numeral 28 designates a plurality of spacers which serve to locate chimney 18 and expanded section 22 concentric with casing 10. Numeral 30 designates a body of pump fluid in the base or boiler of the pump. Numeral 32 designates a cylindrical casing of substantially the same diameter as pump casing 10. It is provided with flanges 34 and 36. Flange 34 cooperates with flange 31 of the pump to make a gas-tight union. Flange 36 connects to the system to be avacuated. Numeral 38 designates a filament which is constructed of a suitable metal which will conduct electricity with considerable generation of heat, such as a tungsten filament. Numerals 40 and 42 designate lead wires connecting to the filament. Numeral 33 designates an annular baffle provided with a circular central opening as illustrated.

Referring to Fig. 2, numeral 60 designates a screen constructed of metal which preferably can be heated to a high temperature without destruction, such as for instance nichrome, tungsten, etc. Numeral 62 designates an annular ring constructed of insulating material which insulates screen 60 from the wall of trap casing 32 and serves to maintain it in the position shown. Numeral 64 designates a lead wire connecting to screen 60.

Referring to Figs 3 and 4 numeral 80 designates a right angled conduit provided with flanges 82 and 84. Flange 82 cooperates with flange 31 of the condensation pump to make a gas-tight connection therewith. Flange 84 connects to the system to be evacuated. Numeral 86 designates a jacket which surrounds a substantial portion of casing 80 and is provided with conduits 88 and 90 for introduction and withdrawal of heating fluid. Numerals 92, 94, 96 and 98 designate a plurality of baffles 92, 94 and 96 on which are annular rings with circular openings. These baffles are located in casing 80 in such a manner that ample space is provided for passage of gases therethrough and into the condensation pump. However, they are so located that vapors passing in a reverse direction from the pump pass into close relation or actual contact therewith. Each of the baffles is provided with an electrical heating means 100, 102, 104 and 106 which are connected in series and which are heated by electricity connected to lead wires 108 and 110.

During operation of the apparatus of Fig. 1 conduit 14 is connected to a backing pump. Flange 36 is connected to the system or receptacle to be evacuated. Pump fluid 30 in the boiler of the pump is heated. The vapors pass through holes 26 and thence downwardly through jet 20. Gases from the system to be evacuated are entrained in the jet and forced into conduit 14 from which they are removed by the backing pump. The pump fluid then condenses on the walls of casing 10, flows downward by gravity through the space 24 between expansion section 22 and casing 10 and thence back into the boiler. Vapors which tend to pass toward the high vacuum end of the pump are partially removed by baffle 33. The remainder of the reverse flowing vapors continue to pass toward the receptacle being evacuated. However, when they condense on the walls of trap casing 32 or when they come in the vicinity of heated filament 38 which is heated to a high temperature they are vaporized or prevented from condensing as the case may be and, therefore, remain in a gaseous or vaporous condition. These vapors then can be effectively removed by the condensation pump in the same manner that gases from the receptacle being evacuated are removed.

The filament 38 can be heated to any temperature above room temperature. It is sufficient to merely heat it to a temperature such that condensation pump fluid is prevented from condensing. This temperature of course will depend upon the pump fluid used and the conditions of operation. The heated filament or equivalent, should be considerably warmer than the walls of the pump where condensation of the vapors takes place. A temperature difference, between the condenser walls and the trap, of 10° C. would be satisfactory. With ordinary pump fluids, such as dibutyl, or dioctyl phthalate, a temperature of about 150–300° will be sufficient. In some cases it is necessary or advantageous to heat the filament to red heat or even to incandescence. At such temperatures (about 400° C. to about 3,000° C.) pump fluid coming into actual contact with the filament is decomposed into permanent gases and can be removed by the pump without trouble. The filament 38 may cover the entire cross-section of the trap casing or only a part thereof. In the latter case the heat is radiated to all parts of the casing. It will be understood that the foregoing temperatures are applicable to all of the pumps illustrated.

In operating the apparatus of Fig. 2 filament 38 is heated to incandescence so that it emits electrons. Screen 60 is positively charged and preferably a high potential difference is maintained between filament 38 and screen 60. The potential difference may be as low as about 250 volts or as high as 5,000–10,000 volts. A potential difference of about 1,000 volts is sufficient in most cases. As a consequence electrons emitted from filament 38 pass to screen 60 and due to this bombardment, screen 60 is effectively heated. Pump fluid vapors which pass in a reverse direction from jet 20 are effectively heated by filament 30 and screen 60 and prevented from condensing as described in connection with Fig. 1. These vapors are then withdrawn by the pump.

This particular screen 60 of Fig. 2 may be heated by other methods. For instance the screen may be constructed of suitable resistance wire and an electrical current passed therethrough to heat it to the required temperature.

In operating the apparatus of Figs. 3 and 4 flange 84 is connected to the system to be evacuated and the condensation pump is put into operation as described above. Baffle plates 92, 94, 96 and 98 are then heated by electrical current passed through lead wires 108 and 110. The walls of the right angle casing 80 are heated by passing a hot liquid or vapor through conduits 88 and 90. Reverse flowing pump fluid comes into contact with hot baffles 92, 94, 96 and 98 and is maintained in a vapor condition. This vapor is then withdrawn from the system by the action of the condensation pump and backing pump. Any pump fluid passing through the system of baffles will pass into contact with the right angle bend of conduit 80 and since the walls are heated they will be maintained in a vapor condition in which state they are effectively removed by the condensation pump.

The baffle system or the heated jacket is usually sufficient when used alone to effectively remove vapors or prevent them from condensing. Therefore, either of these expedients may be used alone if desired.

Although I have illustrated by invention in conjunction with a vertical condensation pump, the invention is useful for trapping or removing vapors from condensation pumps in general, including horizontal pumps and fractionating or non-fractionating pumps, such as those disclosed in Hickman Patents 2,153,189, April 1, 1939, and 2,080,421, May 18, 1937; Embree, 2,150,676, March 14, 1939; Langmuir, 1,320,874, November 4, 1919; Crawford, 1,367,865, February 8, 1921. Likewise, the baffle 33 is advantageous since it removes a substantial portion of the reverse flowing vapors. However, it can be eliminated, in wihch case the heated surfaces can be relied upon to effectively romove the backstreaming or reverse flowing vapors. In such a case, however, the heated surfaces must be sufficiently extensive to effectively heat or contact the vapors.

My invention has the advantage that reverse flowing pump fluid vapors can be effectively prevented from condensing in the high vacuum end of the pump or can be effectively reevaporated and caused to reenter the pump. It has the added advantage that this is accomplished by a relatively cheap means involving heat instead of expensive cooling means heretofore employed. My invention has the added advantage that when the heated trap is put into operation, little or no attention is required from the operator.

What I claim is:

1. High vacuum pumping apparatus comprising in combination, a condensation pump and means located at the intake side thereof for heating vapors during operation of the pump, which vapors, during operation, pass from the pump in a direction opposite to that in which gases being pumped are moving.

2. High vacuum pumping appartus comprising in combination, a condensation pump and a heated surface located at the intake side of the pump in such a way that gases being pumped can pass therethrough without substantial interference and which is adapted, during operation of the pump, to heat vapors which pass from the pump in a direction opposite to that in which gases being pumped are moving.

3. High vacuum pumping apparatus comprising in combination, a condensation pump, a surface located at the intake side of the pump in such a way that gases being pumped can pass therethrough without substantial interference, means for heating said surface whereby, during operation of the pump, pump vapors which pass in a direction opposite to that in which gases being pumped are moving, are heated and prevented from condensing.

4. High vacuum pumping apparatus comprising in combination, a condensation pump, a plurality of baffle surfaces located at the high vacuum end of the pump in such a way that gases being pumped can pass therethrough without substantial interference, but pump vapors flowing in a reverse direction pass into actual contact or close relation therewith, and means for heating said surfaces whereby during operation of the pump reverse flowing pump vapors are heated and prevented from condensing at the high vacuum end of the pump.

5. A high vacuum vapor trap which comprises in combination a vacuum-tight trap casing adapted to be connected at its opposite ends to a high vacuum system at a position between the receptacle being evacuated and the evacuating vapor pump, said casing being free of obstructions which would substantially interfere with flow of gases therethrough and means for heating said trap.

6. A high vacuum vapor trap which comprises in combination a vacuum-tight trap casing adapted to be connected into a high vacuum system at a position between the receptacle being evacuated and the evacuating condensation pump so that gases being pumped must pass therethrough, a plurality of baffle surfaces located in the trap casing in such a way that gases being pumped can pass therethrough without harmful interference; but pump vapors flowing in a reverse direction pass into actual contact or close relation therewith and means for heating the baffle surfaces.

7. The process of preventing reverse flowing vapors derived from a high vacuum condensation pump jet from pasisng into the system to be evacuated which comprises heating the reverse flowing vapors during operation of the pump at a point intermediate the condensation pump and the system being evacuated.

8. In the process of evacuating a closed system with a high vacuum condensation pump, the step which comprises heating reverse flowing vapors from the condensation pump to a temperature at least high enough to maintain them in a vapor ous condition, whereby they are substantially prevented from exerting a harmful effect upon the vacuum in the closed system.

9. In the process of exacuating a closed system with a high vacuum condensation pump, the step which comprises heating reverse flowing vapors from the condensation pump to a temperature of between approximately 150° and 3000° C., whereby these vapors are substantially prevented from exerting a harmful effect upon the vacuum in the closed system.

10. In the process of evacuating a closed system with a high vacuum condensation pump, the step which comprises heating reverse flowing vapors from the condensation pump to a temperature sufficiently high to decompose said vapors into more elementary substances having a substantially higher vapor pressure, whereby said vapors are converted into a form in which they can be easily removed by the condensation pump and are prevented from exerting a harmful effect upon the vacuum in the closed system.

RICHARD S. MORSE.